US012404775B1

(12) United States Patent
Lavine et al.

(10) Patent No.: US 12,404,775 B1
(45) Date of Patent: Sep. 2, 2025

(54) TURBINE BLADE WITH COOLING CHANNELS

(71) Applicant: RTX Corporation, Farmington, CT (US)

(72) Inventors: Griffin D. Lavine, South Glastonbury, CT (US); Brandon W. Spangler, Vernon, CT (US); David R. Pack, Gold Canyon, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/886,974

(22) Filed: Sep. 16, 2024

(51) Int. Cl.
*F01D 5/18* (2006.01)

(52) U.S. Cl.
CPC .......... *F01D 5/187* (2013.01); *F05D 2260/20* (2013.01)

(58) Field of Classification Search
CPC ........................................................ F01D 5/187
See application file for complete search history.

(56) References Cited

U.S. PATENT DOCUMENTS 5,562,409 A * 10/1996 Livsey .................... F01D 5/187 415/115
7,137,781 B2 11/2006 Harvey
9,765,642 B2 9/2017 Smith
9,863,254 B2 1/2018 Ceglio
9,879,547 B2 * 1/2018 Potter ...................... F01D 5/187
9,890,647 B2 * 2/2018 Chamberlain ........... B23H 9/14
9,995,149 B2 * 6/2018 Foster ...................... F01D 5/187
10,378,364 B2 * 8/2019 Spangler ................... F02C 7/18
10,871,074 B2 * 12/2020 Spangler ................. F01D 5/187
11,199,098 B2 12/2021 Leary
11,629,602 B2 * 4/2023 Spangler ................. F01D 5/187 415/115
2024/0159151 A1 5/2024 Konitzer

FOREIGN PATENT DOCUMENTS

WO 9837310 W 8/1998

* cited by examiner

*Primary Examiner* — Justin D Seabe
(74) *Attorney, Agent, or Firm* — Getz Balich LLC

(57) ABSTRACT

A turbine engine rotor blade is provided that has an airfoil that includes a side wall with exterior and interior wall surfaces. The airfoil includes a first wall channel that is defined by a base surface that is a portion of the side wall interior surface and first and second interior wall surfaces. A first interface surface extends between the base surface and the first interior wall surface. A second interface surface extends between the base surface and the second interior wall surface. A third interface surface extends between the first interior wall surface and the second interior wall surface. The base surface includes base surface first and second segments, and a peak interface surface extending between the base surface first and second segments. The first interface surface is disposed closer to the side wall exterior surface than both the second interface surface and the peak interface surface.

20 Claims, 8 Drawing Sheets

TURBINE BLADE WITH COOLING CHANNELS

BACKGROUND OF THE INVENTION

1. Technical Field

This application relates to gas turbine engine rotor blades in general, and to gas turbine engine rotor blades including internal cooling air channels in particular.

2. Background Information

Rotor blades within a gas turbine engine may include internal channels configured to receive and distribute cooling air internally within the airfoil of the rotor blade. In turbine blades there are a number of competing factors that impact the design of the internal cooling passages. The passages must withstand stress and strain caused by thermal loads and mechanical stress caused by centrifugal loads. The size of the internal cooling channels must be sufficient to provide adequate cooling, but not compromise the mechanical strength of the rotor blade.

SUMMARY OF THE INVENTION

According to an aspect of the present disclosure, a turbine engine rotor blade is provided that includes a root and an airfoil. The airfoil extends spanwise between a tip and a base, and includes a side wall with a side wall exterior surface and a side wall interior surface. The side wall exterior surface extends between a leading edge of the airfoil and a trailing edge and spanwise between the tip and the base. The airfoil includes at least one first wall channel. The first wall channel is defined by a base surface that is a portion of the side wall interior surface, a first interior wall surface, and a second interior wall surface. A first interface surface extends between the base surface and the first interior wall surface. A second interface surface extends between the base surface and the second interior wall surface. A third interface surface extends between the first interior wall surface and the second interior wall surface. The base surface includes a base surface first segment, a base surface second segment, and a peak interface surface extending between the base surface first segment and the base surface second segment. The base surface first segment and the base surface second segment are disposed at an oblique angle. The third interface surface is spaced apart from the peak interface surface. The first wall channel is oriented such that first interface surface is disposed closer to the side wall exterior surface than both the second interface surface and the peak interface surface.

In any of the aspects or embodiments described above and herein, the side wall may be a pressure side wall of the airfoil, wherein the side wall exterior surface is a pressure side wall exterior surface, and the side wall interior surface is a pressure side wall interior surface.

In any of the aspects or embodiments described above and herein, the first interior wall surface may extend between the first interface surface and the third interface surface, and the second interior wall surface may extend between the second interface surface and the third interface surface.

In any of the aspects or embodiments described above and herein, the base surface first segment may extend between the first interface surface and the peak interface surface, and the base surface second segment may extend between the second interface surface and the peak interface surface.

In any of the aspects or embodiments described above and herein, the rotor blade may include a cooling aperture extending between the base surface and the side wall exterior surface.

In any of the aspects or embodiments described above and herein, the cooling aperture may have a central axis that intersects with the third interface surface.

In any of the aspects or embodiments described above and herein, the cooling aperture may be a shaped cooling aperture with a metering segment and a diffuser segment, wherein the metering segment extends between the base surface and the diffuser segment, and the diffuser segment extends between the metering segment and the side wall exterior surface; e.g., the pressure side wall exterior surface.

In any of the aspects or embodiments described above and herein, the diffuser segment may expand in a direction downstream of the cooling aperture central axis.

In any of the aspects or embodiments described above and herein, the cooling aperture central axis may intersect with the base surface second segment.

In any of the aspects or embodiments described above and herein, the second interface surface and the peak interface surface may be equidistant from the side wall exterior surface.

In any of the aspects or embodiments described above and herein, the first interface surface, the second interface surface, the third interface surface, and the peak interface surface may be arcuately shaped.

According to an aspect of the present disclosure, a turbine engine rotor blade is provided that includes a root and an airfoil. The airfoil extends spanwise between a tip and a base. The airfoil includes a side wall with a side wall exterior surface and a side wall interior surface. The side wall exterior surface extends between a leading edge of the airfoil and a trailing edge and spanwise between the tip and the base. The airfoil includes at least one first wall channel, and the first wall channel is defined by a base surface that is a portion of the side wall interior surface, a first interior wall surface, and a second interior wall surface. A first interface surface extends between the base surface and the first interior wall surface. A second interface surface extends between the base surface and the second interior wall surface. A third interface surface extends between the first interior wall surface and the second interior wall surface. The base surface includes a base surface first segment, a base surface second segment, and a peak interface surface extending between the base surface first segment and the base surface second segment. The base surface first segment and the base surface second segment are disposed at an oblique angle. The third interface surface is spaced apart from the peak interface surface. A cooling aperture extends between the base surface and the side wall exterior surface. The cooling aperture has a central axis that intersects with the third interface surface.

According to an aspect of the present disclosure, a turbine engine rotor blade is provided that includes a root and an airfoil. The airfoil extends spanwise between a tip and a base. The airfoil includes a side wall with a side wall exterior surface and a side wall interior surface. The side wall exterior surface extends between a leading edge of the airfoil and a trailing edge and spanwise between the tip and the base. The airfoil includes at least one first wall channel, and the first wall channel is defined by a base surface that is a portion of the side wall interior surface, a first interior wall surface, and a second interior wall surface. A first interface surface extends between the base surface and the first interior wall surface. A second interface surface extends between the base surface and the second interior wall surface. A third interface surface extends between the first interior wall surface and the second interior wall surface. The base surface includes a base surface first segment, a base surface second segment, and a peak interface surface extending between the base surface first segment and the base surface second segment. The base surface first segment and the base surface second segment are disposed at an oblique angle. The third interface surface is spaced apart from the peak interface surface. The second interface surface and the peak interface surface are equidistant from the side wall exterior surface. A cooling aperture extends between the base surface and the side wall exterior surface. The cooling aperture has a central axis that intersects with the base surface second segment.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
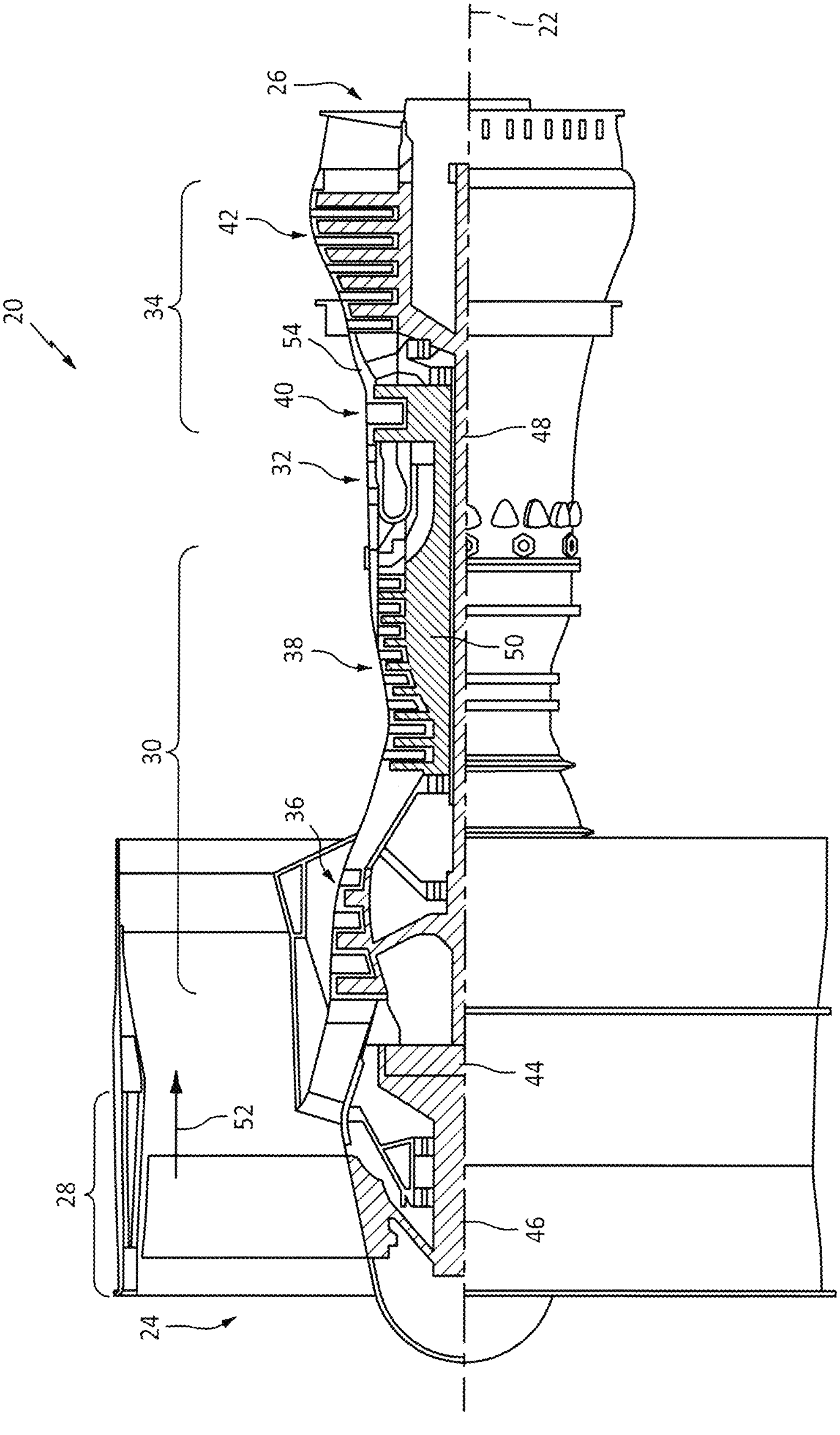
FIG. 1 is a diagrammatic view of a gas turbine engine embodiment.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The compressor section 30 includes a low-pressure compressor (LPC) 36 and a high-pressure compressor (HPC) 38. The turbine section 34 includes a high-pressure turbine (HPT) 40 and a low-pressure turbine (LPT) 42. The engine sections are arranged sequentially along the centerline 22. The fan section 28 is connected to a geared architecture 44, for example, through a fan shaft 46. The geared architecture 44 and the LPC 36 are connected to and driven by the LPT 42 through a low-speed shaft 48. The geared architecture 44 may be configured as an epicyclic gear train, such as a planetary gear system or a star gear system. The present disclosure may be used in gas turbine engines with or without a geared architecture 44, and consequently the present disclosure does not require a geared architecture 44. The HPC 38 is connected to and driven by the HPT 40 through a high-speed shaft 50. In this gas turbine embodiment, the fan section 28 drives air along a bypass flow path 52 in a bypass duct defined within a structure such as a fan case or nacelle. Airflow in a core flow path 54 is compressed by the LPC 36 then the HPC 38, mixed and burned with fuel in the combustor section 32, then expanded through the HPT 40 and the LPT 42.

The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration, including the two-spool engine configuration shown, and may be utilized with single spool gas turbine engines as well as three spool gas turbine engines and the like.

Figure 2:
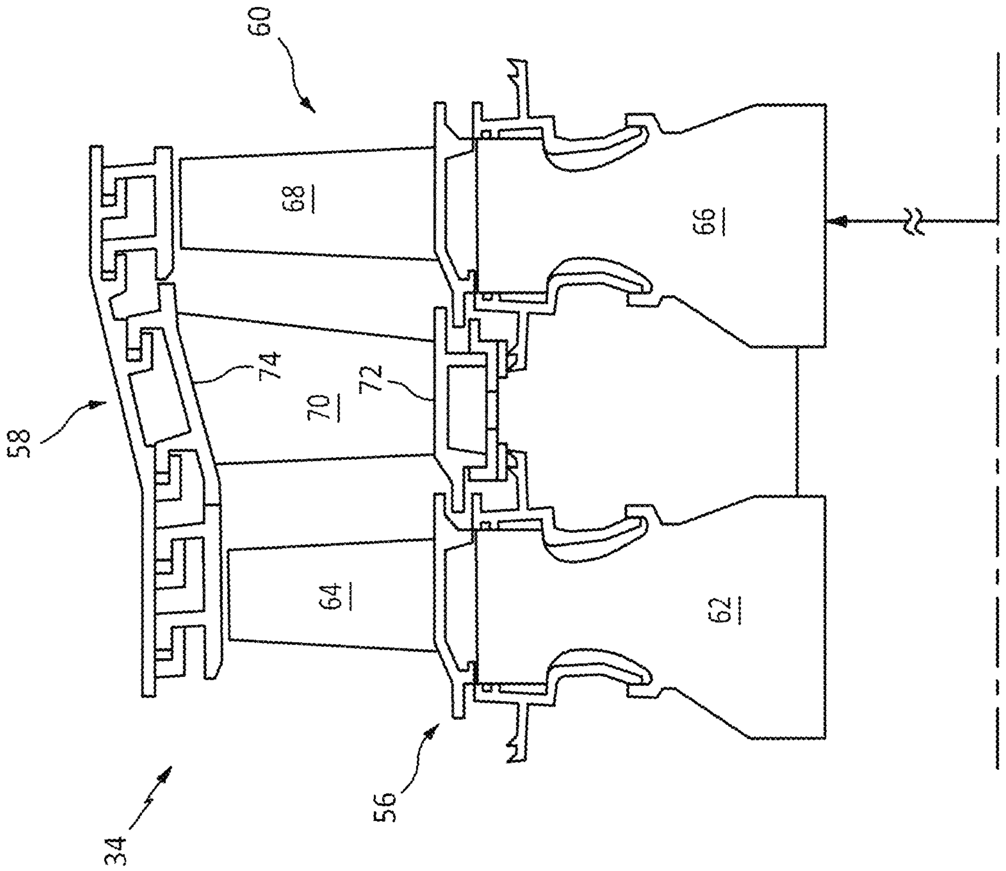
FIG. 2 is a diagrammatic partial view of a gas turbine engine turbine section.

The LPC 36, HPC 38, HPT 40, and LPT 42 each include one or more rotor stages. Each rotor stage includes a rotor and a stator. FIG. 2 diagrammatically illustrates a portion of a turbine section 34 that includes a first turbine rotor 56, a first turbine stator 58, and a second turbine rotor 60. The first and second turbine rotors 56, 60 are rotatable about a rotational axis; e.g., the axial centerline 22 of the engine 20. To facilitate the description herein, the rotational axis of the rotor stages 56, 60 will be described herein as being coincident with the axial centerline 22 of the engine 20, but the present disclosure does not require the rotational axis to be coincident with the axial centerline 22 of the engine 20. The first turbine stator 58 is disposed axially between the first turbine rotor 56 and the second turbine rotor 60; i.e., the first turbine stator 58 is disposed aft of the first turbine rotor 56 and forward of the second turbine rotor 60. The first turbine rotor 56 has a first disk 62 and a plurality of first turbine blades 64 extending radially out from the first disk 62, disposed around circumference of the first disk 62. The second turbine rotor 60 has a second disk 66 and a plurality of second turbine blades 68 extending radially out from the second disk 66, disposed around circumference of the second disk 66. The first and second rotor blades 64, 68 may be attached to the respective first and second disks 62, 66 by a mechanical attachment configuration; e.g., each turbine blade 64, 68 may include a blade root (e.g., see FIG. 3) that is received within mating slot disposed within the respective disk 62, 66. The present disclosure is not limited to any particular attachment configuration between the first rotor blades 64 and the first disk 62, or any particular attachment configuration between the second rotor blades 68 and the second disk 66. The first turbine stator 58 is an annular configuration disposed circumferentially around the axial centerline 22 and includes a plurality of stator vanes 70 extending radially between an inner radial platform 72 and an outer radial platform 74. The present disclosure is not limited to any particular first turbine stator 58 configuration.

Figure 3:
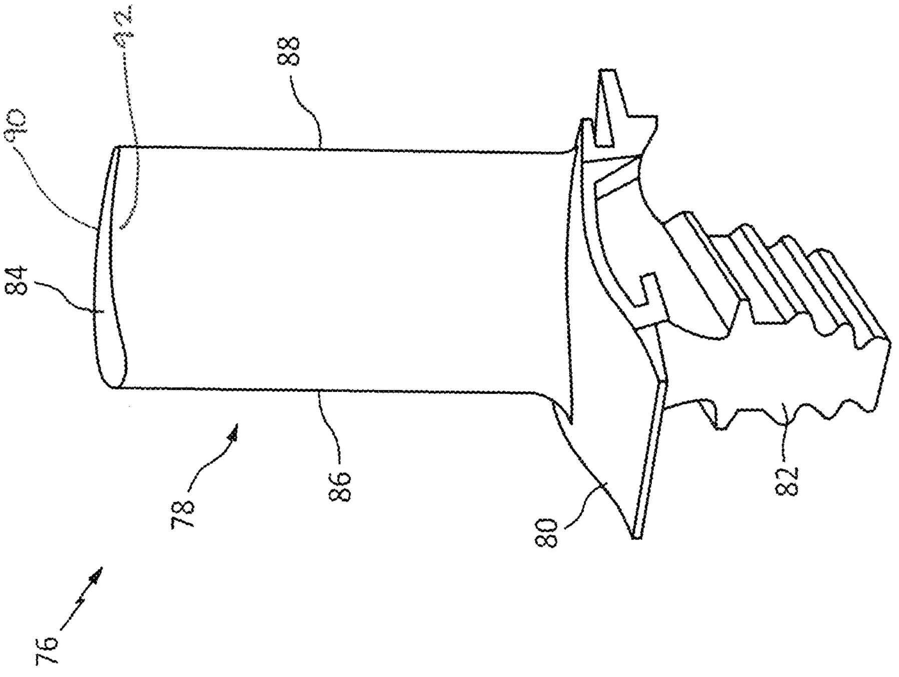
FIG. 3 is a diagrammatic view of a rotor blade.

FIG. 3 diagrammatically illustrates a rotor blade 76 such as those included in the first turbine rotor 56 and the second turbine rotor 60 (see FIG. 2). This non-limiting example of a rotor blade 76 includes an airfoil 78, a platform 80, and a blade root 82. In some embodiments, a rotor blade 76 according to the present disclosure may not include a platform 80. The airfoil 78 has a span that extends from the platform 80 (the platform 80 is located at a base of the airfoil 78) to the blade tip 84 and a chord that extends from a leading edge 86 to a trailing edge 88. The airfoil 78 has a thickness that extends between a suction side exterior surface 90 and a pressure side exterior surface 92 (e.g., see also FIG. 4). The platform 80 may have a forward portion extending outwardly from the leading edge 86, an aft portion extending outwardly from the trailing edge 88, a first lateral side portion extending laterally out from the pressure side exterior surface 92, and a second lateral side portion extending laterally out from the suction side exterior surface 90. The root 82 extends between a base of the rotor blade 76 to the platform 80. The root 82 includes one or more interior channels 94 (e.g., see FIG. 7) that allow passage of cooling air through the root 82 and into the airfoil 78 for cooling purposes as will be detailed herein. The present disclosure is not limited to any particular number of root interior channels 94 or any particular root interior channel 94 configuration.

Figure 4:
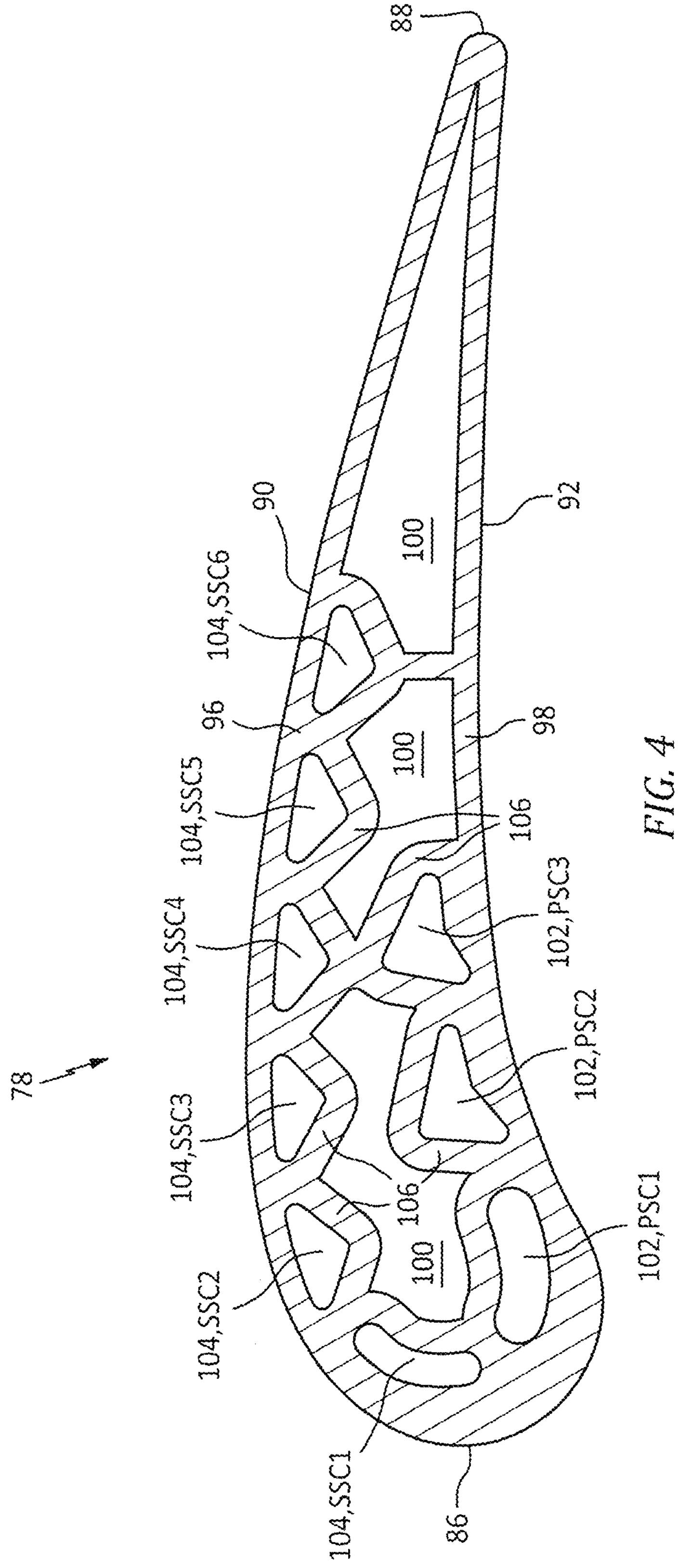
FIG. 4 sectional view of a present disclosure airfoil embodiment.

FIG. 4 is a cross-sectional view of a rotor blade airfoil 78 that may be included in a rotor blade 76. The suction side wall exterior surface 90 defines the exterior surface of a suction side wall 96 and the pressure side wall exterior surface 92 defines the exterior surface of a pressure side wall 98. To simplify the description herein, the pressure side wall 98 and the suction side wall 96 will be described herein as intersecting along the leading edge 86, and intersecting along the trailing edge 88. The suction side wall 96 has a thickness and the pressure side wall 98 has a thickness.

A rotor blade 76 like that diagrammatically shown in FIG. 4 may include a plurality of interior channels. The specific non-limiting rotor blade 76 example diagrammatically shown in FIG. 4 includes interior channels in the form of first wall channels 104 contiguous with the suction side wall 96 of the airfoil 78 that may be referenced as suction side channel 1 (SSC1), suction side channel 2 (SSC2), suction side channel 3 (SSC3), suction side channel 4 (SSC4), suction side channel 5 (SSC5), and suction side channel 6 (SSC6). The rotor blade 76 example shown in FIG. 4 further includes a plurality of second wall channels 102 contiguous with the pressure side wall 98 of the airfoil 78 that may be referenced as pressure side channel 1 (PSC1), pressure side channel 2 (PSC2), and pressure side channel 3 (PSC3). The rotor blade 76 example shown in FIG. 4 further includes a plurality of central channels 100.

The rotor blade 76 includes a plurality of interior walls 106 that define in part or in whole the central channel, the first wall channels 104, and the second wall channels. The interior walls 106 may have a uniform thickness or the interior walls 106 may vary in thickness.

As indicated above, the rotor blade root 82 may include one or more root interior channels 94 (e.g., see FIG. 7) that allow passage of cooling air through the root 82 and into the airfoil 78 for cooling purposes. The root interior channels 94 may be in fluid communication with central channels 100, or the first wall channels 104, or the second wall channels 102, or any combination thereof. In some embodiments, a root interior channel 94 may be in fluid communication with first type of interior channel disposed within the airfoil 78 (e.g., a central channel) and that airfoil interior channel may then be in fluid communication with another type of airfoil interior channel (e.g., a first wall channel 104, or a second wall channel, or the like). The present disclosure is not limited to any particular air flow configuration within the rotor blade 76. Examples of internal passage configurations are provided herein and shown in FIG. 7.

Figure 5:
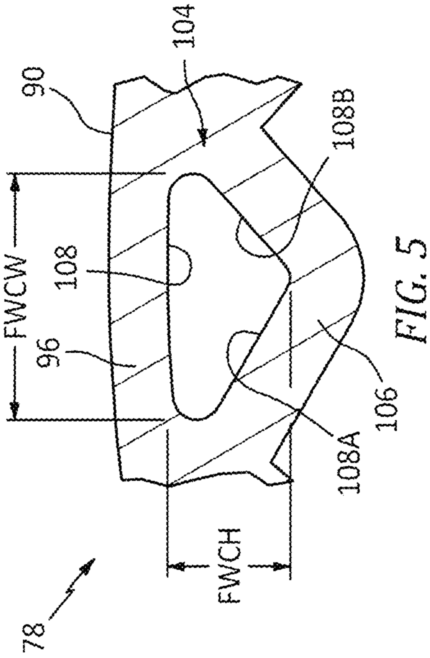
FIG. 5 is an enlarged partial view of the present disclosure airfoil embodiment shown in FIG. 4.

In the non-limiting rotor blade 76 example diagrammatically shown in FIGS. 4 and 5, certain first wall channels 104 (i.e., suction side channels labeled as SSC2-SSC6) have a generally triangular configuration with a base surface 108 defined by a portion of an interior surface of the suction side wall 96 and first and second side surfaces 108A, 108B defined by interior walls 106. FIG. 5 diagrammatically illustrates a first wall channel 104 in enlarged view to facilitate the description herein. The interface between the base surface 108 and the first side surface 108A, the interface between the base surface 108 and the second side surface 108B, and the interface between the first and second side surfaces 108A, 108B each may be arcuately (e.g., circularly) formed. The first wall channel 104 may be described as having a width (FWCW) that extends between the first side surface 108A/base surface 108 interface and the second side surface 108B/base surface 108 interface, and a height (FWCH) that extends along a line perpendicular to the base surface 108 and the first side surface 108A/second side surface 108B interface. In some embodiments, the width (FWCW) of the first wall channel 104 may be greater than the height (FWCH) of the first wall channel 104. The present disclosure is not limited to any particular first wall channel 104 configuration; i.e., the first wall channel 104 is not limited to the exemplary triangular configuration shown and described.

Figure 6:
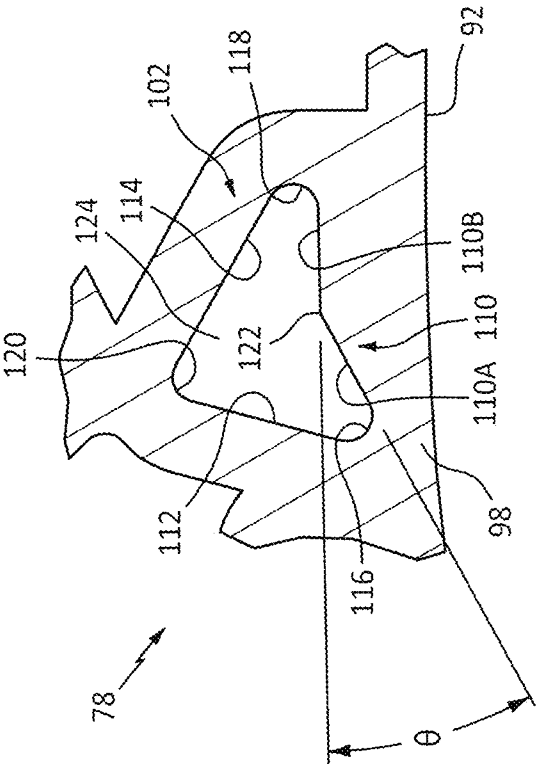
FIG. 6 is an enlarged partial view of the present disclosure airfoil embodiment shown in FIG. 4.
Figure 6B:
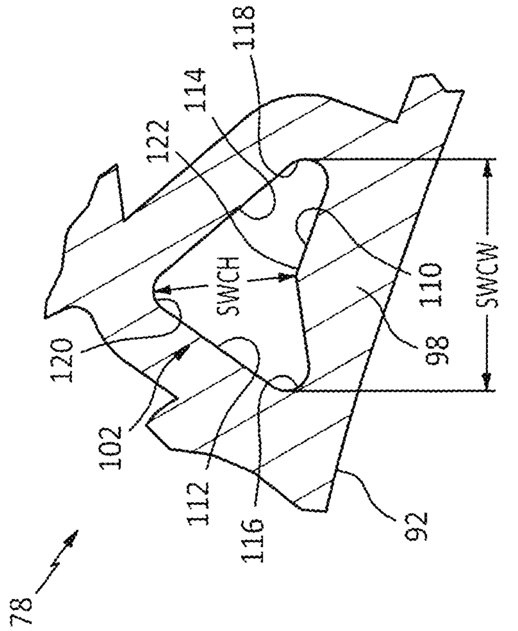
FIG. 6B is an enlarged partial view of the present disclosure airfoil embodiment shown in FIG. 4.

In the non-limiting rotor blade 76 example diagrammatically shown in FIG. 4, certain of the second wall channels 102 (i.e., pressure side channels labeled as PSC2 and PSC3) have a unique configuration that may be described as having an indented body. FIGS. 6-6D diagrammatically illustrate a second wall channel 102 in enlarged view to facilitate the description herein. In some embodiments, the indented body may be an indented generally triangular shape that may be referred to as a "boomerang" like shape. The present disclosure is not, however, limited to an indented body/boomerang shape. Each second wall channel 102 is defined by a base surface 110, a first side surface 112, and a second side surface 114. The base surface is a portion of the interior surface of the pressure side wall 98. The first and second side surfaces 112, 114 are surfaces of respective interior walls 106. FIG. 4 illustrates an embodiment having linear first and second side wall surfaces 112, 114. The present disclosure is not limited to second wall channel 102 embodiments having linear first and second side wall surfaces 112, 114.

A first interface surface 116 extends between base surface 110 and the first side surface 112, a second interface surface 118 extends between the base surface 110 and the second side surface 114, and a third interface surface 120 extends between the first and second side surfaces 112, 114.

The base surface 110 of each second wall channel includes a first base surface segment 110A, a second base surface segment 110B, and a peak interface surface 122 disposed between the first and second base surface segments 110A, 110B. The first base surface segment 110A extends between the first interface surface 116 and the peak interface surface 122. The second base surface segment 110B extends between the second interface surface 118 and the peak interface surface 122. The first and second base surface segments 110A, 110B are disposed at an oblique angle theta ("θ") relative to one another in the range of about 20 to 70 degrees, are therefore not co-linear, and the interface there between forms a peak. The peak formed at the interface between the first and second base surface segments 110A, 110B provides the "indented" aspect of the indented body.

The first, second, third, and peak interface surfaces 116, 118, 120, 122 may be arcuately (e.g., circularly) formed. The first, second, third, and peak interface surfaces 116, 118, 120, 122 may have the same configuration (e.g., the same arcuate configuration, the same radius, or the like) or at least one of the first, second, third, and peak interface surfaces 116, 118, 120, 122 may have a different configuration than the configuration of the other aforesaid interface surfaces. The configuration of the first, second, third, and peak interface surfaces 116, 118, 120, 122 are typically chosen to create a reduced stress zone where the respective surfaces interface with one another, and/or to facilitate manufacturing.

The second wall channel base surface 110, side surfaces 112, 114, and interface surfaces 116, 118, 120, 122 define an interior region 124 (see FIG. 6) of the second wall channel.

Figure 6A:
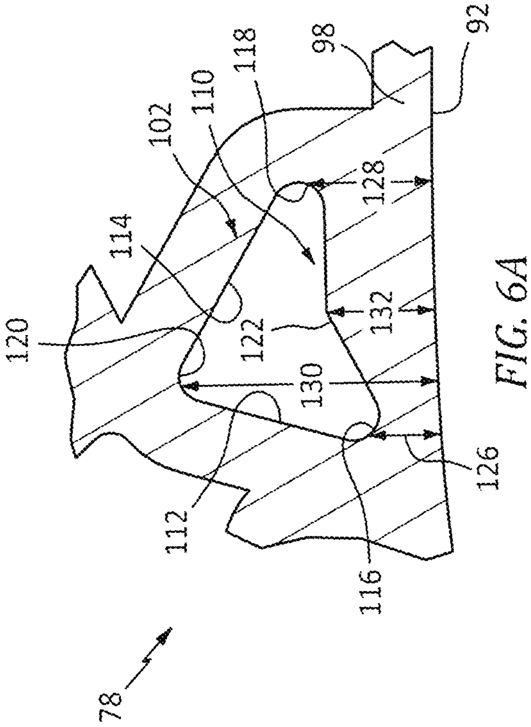
FIG. 6A is an enlarged partial view of the present disclosure airfoil embodiment shown in FIG. 4.
Figure 6D:
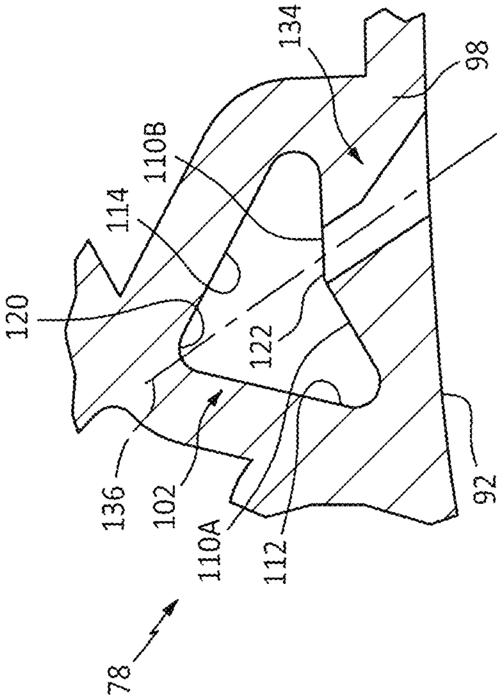
FIG. 6D is an enlarged partial view of the present disclosure airfoil embodiment shown in FIG. 4.

Referring to FIG. 6A, the first interface surface 116 is disposed a distance from the pressure side wall exterior surface 92 (i.e., the first interface separation distance 126), the second interface surface 118 is disposed a distance from the pressure side wall exterior surface 92 (i.e., the second interface separation distance 128), the third interface surface 120 is disposed a distance from the pressure side wall exterior surface 92 (i.e., the third interface separation distance 130), and the peak interface surface 122 is disposed a distance from the pressure side wall exterior surface 92 (i.e., the peak interface separation distance 132). For clarity sake, each distance extends from a midpoint of the respective interface along a respective line that is perpendicular to the pressure side wall exterior surface 92. The first interface separation distance 126 is less than the second interface separation distance 128. Hence, the first interface surface 116 is closer to the pressure side wall exterior surface 92 than the second interface surface 118. The first interface separation distance 126 is also less than the peak interface separation distance 132. Hence, the first interface surface 116 is closer to the pressure side wall exterior surface 92 than the peak interface surface 122. The third interface surface 120 is spaced apart from peak interface surface 122.

In some embodiments, the second base surface segment 110B may be disposed substantially parallel to the adjacent pressure side wall exterior surface 92. The second base surface segment 110B is not required to be substantially parallel to the adjacent pressure side wall exterior surface 92, however. The term "substantially parallel" as used here is intended to mean within a range of +/− five degrees (5°) deviation from parallel. The orientation of the second wall channel 102 having a first interface separation distance 126 less than both the second interface separation distance 128 and the peak interface separation distance 132 creates an increased wall thickness between the second base surface segment 110B and the adjacent pressure side wall exterior surface 92 as compared to the wall thickness disposed between the first base surface segment 110A and the adjacent pressure side wall exterior surface 92 for most of the length of the first base surface segment 110A. An orientation of the second wall channel 102 having a second base surface segment 110B disposed substantially parallel to the adjacent pressure side wall exterior surface 92 is an example of an orientation that creates increased wall thickness. As will be detailed herein, the orientation of the second wall channel 102 that creates increased wall thickness provides considerable benefit in those embodiments wherein shaped cooling apertures are disposed between the second wall channel 102 and the pressure side exterior wall surface 92.

Referring to FIG. 6B, the second wall channel 102 may be described as having a width (SWCW) that extends between the first interface surface 116 and the second interface surface 118 (i.e., at the respective interface surface midpoints), and a height (SWCH) that extends between the peak interface surface 122 and the third interface surface 120 (i.e., at the respective interface surface midpoints).

Figure 6C:
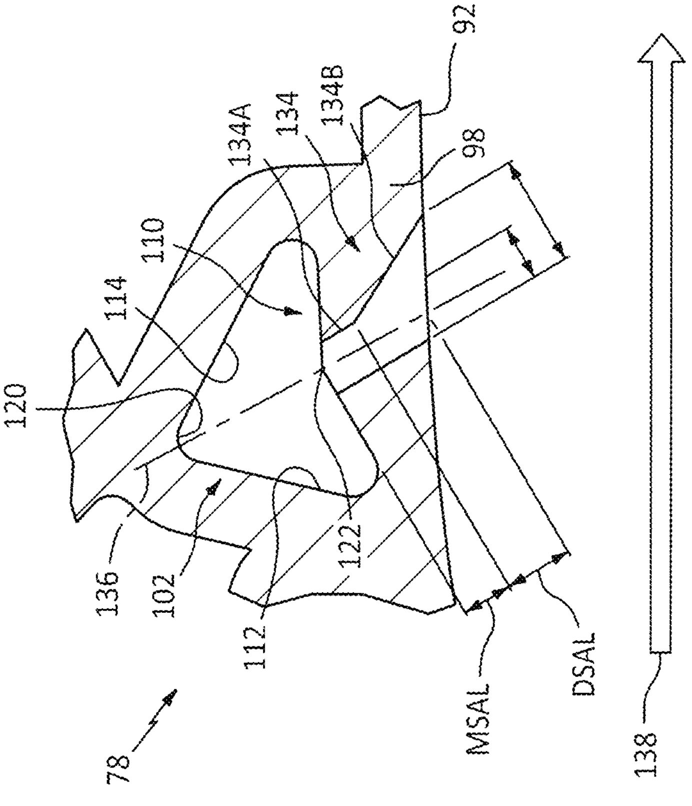
FIG. 6C is an enlarged partial view of the present disclosure airfoil embodiment shown in FIG. 4.

Referring to FIG. 6C, a plurality of cooling apertures 134 extend from the pressure side wall exterior surface 92 to the second wall channel 102 to provide fluid communication there between. The cooling apertures 134 are spaced apart from one another and are distributed in a spanwise direction of the rotor blade airfoil 78. Each cooling aperture 134 extends along a central axis 136 and the central axis 136 intersects the third interface surface 120. Hence, the central axis 136 of each cooling aperture 134 is aligned with the portion of the second wall channel 102 that is furthest away from the cooling aperture 134. In some embodiments, the central axis 136 of each cooling aperture 134 intersects both the third interface surface 120 and the peak interface surface 122; e.g., see FIG. 6C. In some embodiments, the central axis 136 of one or more cooling apertures 134 intersects the third interface surface 120 and intersects the second base surface segment 110B; i.e., the central axis 136 of the cooling aperture 134 is shifted away from the peak interface surface 122 toward the second interface surface 118—see FIG. 6D. In some applications, surface angles between the cooling aperture 134 and the exterior surface may range from about 15 degrees to about 50 degrees, but the present disclosure is not limited to this range or angles.

In some embodiments, one or more of the cooling apertures 134 have a constant diameter between the second wall channel 102 and the pressure side exterior wall surface 92. In some embodiments, one or more of the cooling apertures 134 may be configured as a shaped cooling aperture. A non-limiting example of a shaped cooling aperture 134 is shown in FIG. 6C that includes a metering segment 134A and a diffuser segment 134B that increases in area in a direction toward the pressure side wall exterior surface 92. The shaped cooling aperture 134 is shown shaded to facilitate the view. The metering segment 134A has an axial length (MSAL) and the diffuser segment has an axial length (DSAL). Non-limiting examples of diffuser segment 134B configurations include conical configurations, rectangular configurations, and the like. The diffuser segment 134B of the shaped cooling aperture 134 shown in FIG. 6C opens/expands in area in a direction downstream of the aperture 134. Gas path airflow direction relative to the cooling aperture is indicated by arrow 138. The diffuser segment 134B may be described in terms of "area ratio", which refers to the cross-section area of the cooling aperture 134 at the inlet to the diffuser segment 134B (i.e., shown two-dimensionally at the intersection of the metering segment 134A and the diffuser segment 134B) and the cross-sectional area of the diffuser segment 134B at the aperture 134 exit at the pressure side exterior surface 92 (i.e., shown two-dimensionally at pressure side wall exterior surface 92). In some applications, area ratios can range from about 1.5 to about 5, but the present disclosure is not limited to this range. The thickness of the wall 98 between the base surface 110 of the second wall channel 102 and the pressure side wall exterior surface 92 can limit what cooling aperture configurations can be used between the second wall channel 102 and the pressure side wall exterior surface 92, and consequently limit the options for creating desirable film cooling relative to the pressure side exterior surface 92. For example, in some instances a wall thickness may not provide sufficient area to accommodate a desired shaped cooling hole geometry. The present disclosure second wall channel 102 configuration (e.g., an indented body) and the orientation of the second wall channel 102 relative to the pressure side wall exterior surface 92 makes it possible to utilize a substantial number of different shaped cooling hole 134 configurations; e.g., the increased wall thickness can accommodate a longer length diffuser segment 134B, different diffuser segment 134B configurations, greater range of diffuser segment area ratios, and the like, and any combination thereof.

Equally important is the manufacturing benefit provided by the present disclosure second wall channel 102 geometric configuration and its orientation relative to the pressure side exterior wall surface 92. Airfoil cooling hole apertures are very often produced using a laser drilling technique or an electrical discharge machining (EDM) process. A person of skill in the art will recognize that laser drilling processes and/or EDM processes require locating the tool relative to the airfoil 78 as well as the angular orientation of the tool relative to the airfoil 78. There is always some degree of tolerancing involved in the machining process. The present disclosure second wall channel 102 geometric configuration and its orientation relative to the pressure side exterior wall surface 92 permit greater tolerancing for the cooling aperture 134 positioning; e.g., a range of acceptable locations as is illustrated in the shifted cooling aperture central axis 136 diagrammatically shown in FIG. 6D. In addition, in laser drilling and EDM processes for producing a cooling aperture, the operator must always be careful to avoid "back-strike". The term "back-strike" refers to an instance when the machining process (e.g., laser drilling or EDM forming) undesirably engages with the wall surface opposite the cooling aperture 134. The present disclosure second wall channel 102 geometric configuration and its orientation is such that the wall segment opposite the cooling aperture 134 (i.e., the third interface surface 120) is located furthest away from the cooling aperture 134 relative to the other surfaces that define the second wall channel 102, thereby minimizing back-strike potential relative to other wall segments of the second wall channel 102.

The second wall channel embodiment described herein (e.g., PCS2, PCS3) being disposed relative to the pressure side exterior surface 92 of the airfoil 78. The present disclosure is not limited thereto. In some embodiments, a second wall channel 102 as described herein may be disposed relative to the suction side wall 96 in the manner described. In addition, the second wall channel embodiment (e.g., PCS2, PCS3) is described herein as including cooling apertures 134 in fluid communication with an exterior surface (e.g., the pressure side exterior surface 92). In some embodiments, a second wall channel 102 may not include cooling apertures in fluid communication with an airfoil side surface.

Figure 7:
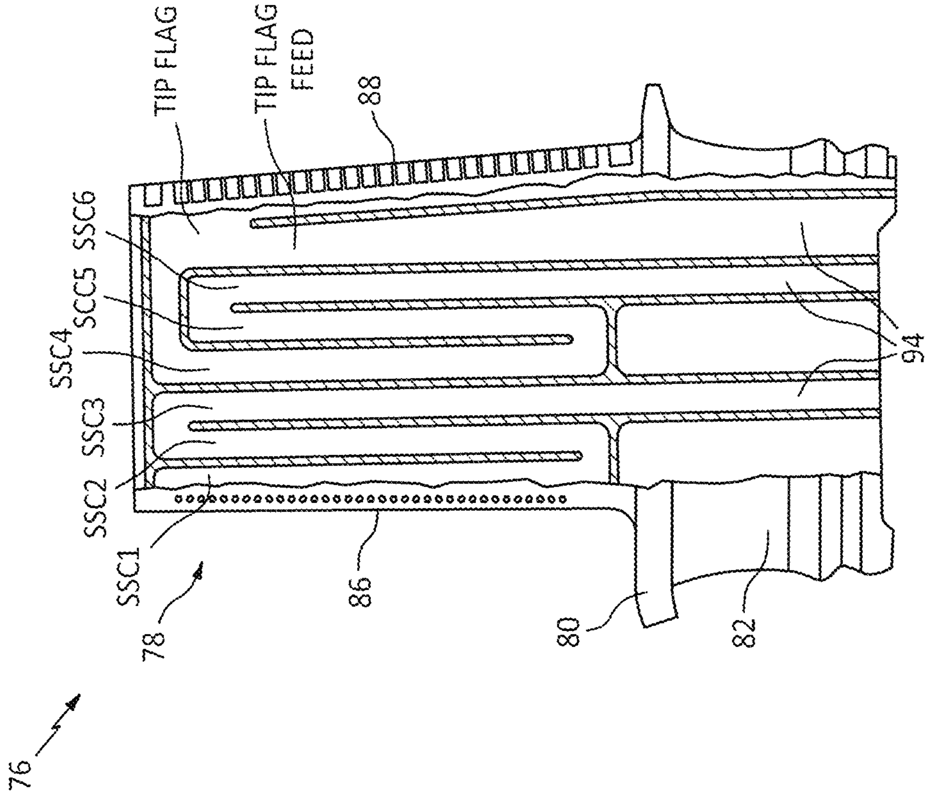
FIG. 7 sectional view of a present disclosure airfoil embodiment.

FIG. 7 is a diagrammatic sectional view of a non-limiting rotor blade 76 example showing the rotor blade 76 open from the root 82 to the tip of the airfoil 78, illustrating the cooling channels (e.g., SSC1-SSC6) adjacent the suction side of the airfoil 78; i.e., the section is taken through SSC1-SSC6. The airfoil 78 includes a plurality of root interior channels 94 that provide fluid communication with the respective channels SSC1-SSC6. In this exemplary embodiment, the root interior channels 94 also provide fluid communication to a tip flag feed proximate the trailing edge 88 of the airfoil 78. As can be seen in FIG. 7, the cooling channels (e.g., SSC1-SSC6) may be configured in serpentine arrangement. The present disclosure is not limited to the embodiment shown in FIG. 7.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A turbine engine rotor blade, comprising:

a root; and an airfoil that extends spanwise between a tip and a base, the airfoil including a side wall with a side wall exterior surface and a side wall interior surface, wherein the side wall exterior surface extends between a leading edge of the airfoil and a trailing edge and spanwise between the tip and the base;

wherein the airfoil includes at least one first wall channel, and the first wall channel is defined by a base surface that is a portion of the side wall interior surface, a first interior wall surface, and a second interior wall surface, wherein a first interface surface extends between the base surface and the first interior wall surface, a second interface surface extends between the base surface and the second interior wall surface, and a third interface surface extends between the first interior wall surface and the second interior wall surface; and wherein the base surface includes a base surface first segment, a base surface second segment, and a peak interface surface extending between the base surface first segment and the base surface second segment, and wherein the base surface first segment and the base surface second segment are disposed at an oblique angle;

wherein the third interface surface is spaced apart from the peak interface surface; and wherein the first wall channel is oriented such that first interface surface is disposed closer to the side wall exterior surface than both the second interface surface and the peak interface surface.

2. The turbine engine rotor blade of claim 1, wherein the first interior wall surface extends between the first interface surface and the third interface surface, and the second interior wall surface extends between the second interface surface and the third interface surface.

3. The turbine engine rotor blade of claim 2, wherein the base surface first segment extends between the first interface surface and the peak interface surface, and the base surface second segment extends between the second interface surface and the peak interface surface.

4. The turbine engine rotor blade of claim 3, further comprising a cooling aperture extending between the base surface and the side wall exterior surface.

5. The turbine engine rotor blade of claim 4, wherein the cooling aperture has a central axis that intersects with the third interface surface.

6. The turbine engine rotor blade of claim 5, wherein the cooling aperture is a shaped cooling aperture with a metering segment and a diffuser segment, wherein the metering segment extends between the base surface and the diffuser segment, and the diffuser segment extends between the metering segment and the side wall exterior surface.

7. The turbine engine rotor blade of claim 6, wherein the diffuser segment expands in a direction downstream of the cooling aperture central axis.

8. The turbine engine rotor blade of claim 7, wherein the cooling aperture central axis intersects with the base surface second segment.

9. The turbine engine rotor blade of claim 8, wherein the side wall is a pressure side wall of the airfoil, the side wall exterior surface is a pressure side wall exterior surface, and the side wall interior surface is a pressure side wall interior surface.

10. The turbine engine rotor blade of claim 2, wherein the second interface surface and the peak interface surface are equidistant from the side wall exterior surface.

11. The turbine engine rotor blade of claim 1, wherein the first interface surface, the second interface surface, the third interface surface, and the peak interface surface are arcuately shaped.

12. The turbine engine rotor blade of claim 1, further comprising a cooling aperture extending between the base surface and the side wall exterior surface.

13. The turbine engine rotor blade of claim 12, wherein the cooling aperture has a central axis that intersects with the third interface surface.

14. A turbine engine rotor blade, comprising:

a root; and an airfoil that extends spanwise between a tip and a base, the airfoil including a side wall with a side wall exterior surface and a side wall interior surface, wherein the side wall exterior surface extends between a leading edge of the airfoil and a trailing edge and spanwise between the tip and the base;

wherein the airfoil includes at least one first wall channel, and the first wall channel is defined by a base surface that is a portion of the side wall interior surface, a first interior wall surface, and a second interior wall surface, wherein a first interface surface extends between the base surface and the first interior wall surface, a second interface surface extends between the base surface and the second interior wall surface, and a third interface surface extends between the first interior wall surface and the second interior wall surface; and wherein the base surface includes a base surface first segment, a base surface second segment, and a peak interface surface extending between the base surface first segment and the base surface second segment, and wherein the base surface first segment and the base surface second segment are disposed at an oblique angle;

wherein the third interface surface is spaced apart from the peak interface surface;

wherein the first interface surface is disposed from the sidewall exterior surface a first interface separation distance, the peak interface surface is disposed from the sidewall exterior surface a peak interface separation distance, the first interface separation distance less than the peak interface separation distance, the second interface surface is disposed from the exterior sidewall a second interface separation distance, and the first interface separation distance is less than the second interface separation distance; and a cooling aperture extending between the base surface and the side wall exterior surface, wherein the cooling aperture has a central axis that intersects with the third interface surface.

15. The turbine engine rotor blade of claim 14, wherein the cooling aperture is a shaped cooling aperture with a metering segment and a diffuser segment, wherein the metering segment extends between the base surface and the diffuser segment, and the diffuser segment extends between the metering segment and the side wall exterior surface.

16. The turbine engine rotor blade of claim 15, wherein the diffuser segment expands in a direction downstream of the cooling aperture central axis.

17. The turbine engine rotor blade of claim 16, wherein the side wall is a pressure side wall of the airfoil, the side wall exterior surface is a pressure side wall exterior surface, and the side wall interior surface is a pressure side wall interior surface.

18. The turbine engine rotor blade of claim 14, wherein the cooling aperture central axis intersects with the base surface second segment.

19. A turbine engine rotor blade, comprising:

a root; and an airfoil that extends spanwise between a tip and a base, the airfoil including a side wall with a side wall exterior surface and a side wall interior surface, wherein the side wall exterior surface extends between a leading edge of the airfoil and a trailing edge and spanwise between the tip and the base;

wherein the airfoil includes at least one first wall channel, and the first wall channel is defined by a base surface that is a portion of the side wall interior surface, a first interior wall surface, and a second interior wall surface, wherein a first interface surface extends between the base surface and the first interior wall surface, a second interface surface extends between the base surface and the second interior wall surface, and a third interface surface extends between the first interior wall surface and the second interior wall surface; and wherein the base surface includes a base surface first segment, a base surface second segment, and a peak interface surface extending between the base surface first segment and the base surface second segment, and wherein the base surface first segment and the base surface second segment are disposed at an oblique angle;

wherein the third interface surface is spaced apart from the peak interface surface; and wherein the second interface surface and the peak interface surface are equidistant from the side wall exterior surface and the first interface surface is disposed closer to the side wall exterior surface than the second interface surface and the peak interface surface; and a cooling aperture extending between the base surface and the side wall exterior surface, wherein the cooling aperture has a central axis that intersects with the base surface second segment.

20. The turbine engine rotor blade of claim 19, wherein the cooling aperture is a shaped cooling aperture with a metering segment and a diffuser segment, wherein the metering segment extends between the base surface and the diffuser segment, and the diffuser segment extends between the metering segment and the side wall exterior surface, and the diffuser segment expands in a direction downstream of the cooling aperture central axis.

* * * * *